United States Patent
Hiraka et al.

(10) Patent No.: US 6,996,324 B2
(45) Date of Patent: Feb. 7, 2006

(54) OPTICAL WAVEGUIDE AND METHOD FOR FABRICATING THE SAME

(75) Inventors: Masahiro Hiraka, Nara (JP); Shigeo Furukawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 45 days.

(21) Appl. No.: 10/432,920

(22) PCT Filed: Sep. 18, 2002

(86) PCT No.: PCT/JP02/09574

§ 371 (c)(1),
(2), (4) Date: Dec. 4, 2003

(87) PCT Pub. No.: WO03/027736

PCT Pub. Date: Apr. 3, 2003

(65) Prior Publication Data

US 2004/0071424 A1 Apr. 15, 2004

(30) Foreign Application Priority Data

Sep. 19, 2001 (JP) ........................ 2001-285435

(51) Int. Cl.
*G02B 6/00* (2006.01)
*G02B 6/10* (2006.01)
*C03B 37/022* (2006.01)
*C03B 37/033* (2006.01)
*C03B 37/075* (2006.01)

(52) U.S. Cl. ................. 385/141; 385/142; 385/144; 385/129; 65/385; 65/386; 65/388; 65/397; 65/398; 264/1.24

(58) Field of Classification Search .............. 385/15, 385/31, 129–132, 141–145; 65/385–435; 264/1.24–1.29
See application file for complete search history.

(56) References Cited

U.S. PATENT DOCUMENTS 4,066,466 A * 1/1978 Neely, Jr. .............. 501/35

(Continued)

FOREIGN PATENT DOCUMENTS

| JP | 05-273417 | 10/1993 |
| JP | 2831407 | 9/1998 |
| JP | 10-300962 | 11/1998 |
| JP | 2001-264566 | 9/2001 |

OTHER PUBLICATIONS

Ohara Corporation, Ohara Glass Catalog, Jun. 2002, http://www.oharacorp.com/PDF/Ohara_Glass_Catakig.pdf.*

(Continued)

*Primary Examiner*—Brian Healy
*Assistant Examiner*—Ryan Lepisto
(74) *Attorney, Agent, or Firm*—RatnerPrestia

(57) ABSTRACT

An optical waveguide comprising cladding 1 and core segment 20 buried in cladding 1 and serving as a waveguide, wherein a combination of glass material constituting the core segment 20 and another glass material constituting the cladding 1 is so selected that an absolute value of difference in coefficient of thermal expansion between these materials $(\alpha 1 - \alpha 2)$ is within a range of 0 and $9 \times 10^{-7}$ ° C., where $\alpha 1$ denotes a coefficient of thermal expansion of the former material and $\alpha 2$ denotes that of the latter material. Since this makes possible to bond directly the glass materials having different refraction factors and different coefficients of thermal expansion, and to produce the optical waveguide at even a lower temperature as compared to the prior art method as an upper cladding layer is formed with the sputtering method, it realizes reduction in number of processes and time of manufacture, thereby providing the optical waveguide of low transmission loss at low cost, as well as a method of manufacturing the same.

23 Claims, 3 Drawing Sheets

U.S. PATENT DOCUMENTS

| | | | | |
|---|---|---|---|---|
| 4,108,674 A | * | 8/1978 | Gliemeroth | 501/13 |
| 4,493,720 A | * | 1/1985 | Gauthier et al. | 65/391 |
| 4,629,485 A | * | 12/1986 | Berkey | 65/398 |
| 4,778,499 A | * | 10/1988 | Beaver | 65/390 |
| 5,148,510 A | * | 9/1992 | Borrelli et al. | 385/142 |
| 5,858,051 A | * | 1/1999 | Komiyama et al. | 65/386 |
| 6,150,027 A | * | 11/2000 | Yamamoto et al. | 428/426 |
| 6,314,228 B1 | * | 11/2001 | Korenaga et al. | 385/129 |
| 6,686,304 B1 | * | 2/2004 | Wallenberger | 501/35 |
| 2002/0118908 A1 | * | 8/2002 | Conde et al. | 385/14 |

OTHER PUBLICATIONS

Japanese International Search Report for PCT/JP02/09924, dated Dec. 3, 2002.

Engllsh translation of Japanese International Search Report for PCT/JP02/09924, dated Dec. 3, 2002.

* cited by examiner

OPTICAL WAVEGUIDE AND METHOD FOR FABRICATING THE SAME

This application is a U.S. National Phase Application of PCT International Application PCT/JP02/09574.

FIELD OF THE INVENTION

The present invention relates to an optical component, and in particular, it relates to an optical waveguide and a method of manufacturing the same.

BACKGROUND OF THE INVENTION

In optical components of a waveguide system such as optical splitters, optical combiners, optical dividers, optical multiplexers and the like, there hitherto are numerous methods of forming optical waveguides on a substrate, which can be categorized generally into two groups that are deposition method and ion exchange method.

Deposition method is the method of forming an $SiO_2$ film on a substrate made of silicon and the like, and it includes the flame hydrolysis deposition method, the plasma assisted chemical vapor deposition method (P-CVD method), the molecular beam epitaxy method (MBE method), and the like, to be more specific.

Referring now to FIG. 3(a)–(c), description is provided hereinafter of a method of manufacturing an optical waveguide using the flame hydrolysis deposition method representing those of the above deposition methods. After fine-grained silicon dioxide ($SiO_2$) added with germanium dioxide ($GeO_2$), or fine-grained silicon dioxide ($SiO_2$) added with titanium oxide ($TiO_2$) is deposited into a thickness of several μm on quartz substrate 7, it is sintered and transparentized to form core layer 8, as shown in FIG. 3(a). Next, the core layer 8 is patterned into a predetermined shape by using the photolithography and dry etching techniques to form core segments 81, as shown in FIG. 3(b). Following the above, silicon dioxide ($SiO_2$) added with phosphorus pentaoxide ($P_2O_5$) and boric oxide ($B_2O_3$) is deposited over the core segments 81 and the quartz substrate 7 again by the flame hydrolysis deposition method. By sintering, transparent upper cladding layer 9 is formed, as shown in FIG. 3(c), to thus complete the optical waveguide.

On the other hand, described next is a manufacturing method using the ion exchange method. In this method, a borosilicate glass substrate is used, and a waveguide pattern is formed on this substrate by using a metal mask. This substrate is then immersed in molten salt containing dopant, to let the dopant diffuse into the glass within the waveguide pattern by taking advantage of the ion-exchange phenomenon of the dopant with the glass components, and to form a core layer in a surface layer of the glass substrate. Because the ion exchange phenomenon does not occur in an area covered by the metal mask, the core layer is produced only in an exposed area into a shape identical to that of the mask pattern.

In addition, the glass substrate is immersed in another molten salt containing only components other than the aforesaid dopant among those present in the glass substrate, and an electric field is applied to the substrate to cause the dopant in the core layer formed in the surface layer to migrate toward inside of the glass substrate, to form core segments of a predetermined shape in the glass substrate. These core segments are parts having a high refraction factor so as to become optical waveguides. After removal of the metal mask, the surface layer of the glass substrate is clad with a material of low refraction factor in a manner to cover the core segments, which serve the optical waveguides, into such a configuration that the core segments are buried.

However, there exists the following problems In the deposition method and the Ion exchange method described above.

Although the optical waveguide formed by the deposition method shows the smallest transmission loss, it has a problem in productivity because it requires many processes to make the optical waveguide as It must go through the deposition and sintering processes for the core segments and the cladding layer, and the patterning process using the photolithography method, each of which requires a long duration of processing time. For instance, the core layer requires 1.5 hours for deposition and 10 hours for sintering. On the other hand, although the optical waveguide can be formed In a comparatively short time with the ion exchange method, It produces uneven distribution of the dopant in a direction of thickness of the glass substrate because the core layer is formed by ion exchange. This consequently produces uneven variation of refraction factor in the direction of thickness and increases the transmission loss, thereby giving rise to a problem.

SUMMARY OF THE INVENTION

An optical waveguide comprises a cladding and a core segment buried in the cladding and serving as a waveguide, wherein a glass material constituting the core segment and another glass material constituting the cladding are so combined that an absolute value of difference In coefficient of thermal expansion between these materials ($\alpha 1 - \alpha 2$) is within a range of 0 and $9 \times 10^{-7}/°$ C., when $\alpha 1$ denotes a coefficient of thermal expansion of the former material and $\alpha 2$ denotes that of the latter material.

Since this makes possible to bond directly between the core segment and the lower cladding layer by using glass materials having different refraction factors and different coefficients of thermal expansion, it realizes good optical characteristics at their interface and increases bonding strength. In addition, the optical waveguide can be produced at even a lower temperature as compared to the prior art method when the upper cladding layer is formed with the sputtering method, thereby realizing not only improvement of flexibility in selecting the materials but also reduction of the cost.

Furthermore, an optical waveguide comprises a cladding and a core segment buried in the cladding and serving as a waveguide, wherein a glass material constituting the core segment and another glass material constituting the cladding are so combined that an absolute value of difference in coefficient of thermal expansion between these materials ($\alpha 1 - \alpha 2$) is within a range of 0 and $9 \times 10_{-7}°$ C., and a yield point of the glass material constituting the core segment Is higher than that of the glass material constituting the cladding by 70 ° C. or greater, when $\alpha 1$ and $At1$ denote a coefficient of thermal expansion and the yield point of the former material, and $\alpha 1$ and $At2$ denote those of the latter material.

This makes possible not only to form the upper cladding layer by the puttering method, but also to adopt an alternative method in which a glass late constituting the cladding layer is integrated into one body with a lower ladding layer by hot pressing in a manner to bury the core segment into the cladding layer. Thus, a cost reduction is realized by way of reducing a number and time of the manufacturing processes.

Also, an optical waveguide has a structure, in which the glass material constituting the core segment comprises borosilicate crown glass having a composition of silicon dioxide ($SiO_2$), boric oxide ($B_2O_3$), alkaline metal oxide ($R_2O$) and diatomic metal oxide (LO) (R: alkaline metal and L: diatomic metal), and the glass material constituting the cladding comprises fluorine crown glass having a composition of silicon dioxide ($SiO_2$), boric oxide ($B_2O_3$) and fluorine compound. Because of this structure, the optical waveguide has an excellent transmission loss factor, and it can be made with low cost.

Furthermore, an optical waveguide has another structure, in which glass materials constituting both the core segment and the cladding comprise fluorine crown glass having a composition of silicon dioxide ($SiO_2$), boric oxide ($B_2O_3$) and fluorine compound, and the materials are so combined that a refraction factor of the core segment Is greater than that of the cladding. Because of this structure, the optical waveguide has an excellent transmission loss factor, and It can be made with low cost.

Also, a method of manufacturing an optical waveguide comprises a step of forming a bonded substrate by pressing and heating a glass plate constituting a lower cladding layer and another glass plate constituting a core layer, which are arranged in a manner that optically polished surfaces of them abut against each other to make direct bonding, a step of finishing a surface of the core layer of the bonded substrate by grinding and/or polishing to obtain a thickness appropriate for a core segment, a step of forming the core segment defining a waveguide by etching the core layer, and a step of forming an upper cladding layer by making a film with sputtering over the lower cladding layer, including the core segment, while burying the core segment at the same time into a cladding comprised of the upper cladding layer and the lower cladding layer. Accordingly, the method can produce an optical waveguide composed of glass materials quite easily while ensuring excellent characteristics.

Moreover, another method of manufacturing an optical waveguide comprises a step of forming a bonded substrate by pressing and heating a glass plate constituting a lower cladding layer and another glass plate constituting a core layer, which are arranged in a manner that optically polished surfaces of them abut against each other to make direct bonding, a step of finishing a surface of the core layer of the bonded substrate by grinding and/or polishing to obtain an appropriate thickness for core segment, a step of forming the core segment defining a waveguide by etching the core layer, and a step of arranging on the core segment an upper cladding layer of glass plate having a yield point lower than that of the core segment, and hot-pressing them by means of heating and pressing at a temperature at least equal to or higher than the yield point of the upper cladding layer, to bond together the upper cladding layer and the lower cladding layer Into an integral body and to bury the core segment at the same time into the cladding while retaining an original shape of the core segment. Accordingly, this method can produce the optical waveguide of excellent optical characteristics in a short time with simple manufacturing processes.

Furthermore, a method of manufacturing an optical waveguide employs a glass material constituting the core segment and another glass material constituting the cladding, wherein an absolute value of difference in coefficient of thermal expansion between these materials ($\alpha 1 - \alpha 2$) is within a range of 0 and $9 \times 10^{-7}/°$ C., when $\alpha 1$ denotes a coefficient of thermal expansion of the former material and $\alpha 2$ denotes that of the latter material. The method can produce easily the optical waveguide which is not liable to produce any crack or separation even after the processes of direct bonding, dicing and the like.

Moreover, a method of manufacturing an optical waveguide employs a glass material constituting the core segment and another glass material constituting the cladding, wherein an absolute value of difference in coefficient of thermal expansion between these materials ($\alpha 1 - \alpha 2$) is within a range of 0 and $9 \times 10^{-7}/°$ C., and a yield point of the glass material constituting the core segment Is higher than that of the glass material constituting the cladding by 70° C. or greater, when $\alpha 1$ and At1 denote a coefficient of thermal expansion and the yield point of the former material, and $\alpha 2$ and At2 denote those of the latter material. This method can produce optical waveguides with constant precision In shape of the core segments and good productivity in the mass-production even though the upper cladding layers are hot-pressed.

A method of manufacturing an optical waveguide includes the step of hot pressing using a temperature higher than the yield point of the glass material constituting the cladding but lower than the yield point of the glass material constituting the core segment. By setting the hot pressing temperature within the above range, this method can reliably bond and Integrate the upper cladding layer and the lower cladding layer into one body while controlling deformation of the core segment.

Moreover, a method of manufacturing an optical waveguide employs glass material constituting the core segment, which comprises borosilicate crown glass containing silicon dioxide ($SiO_2$), boric oxide ($B_2O_3$), alkaline metal oxide ($R_2O$) and diatomic metal oxide (LO) (R: alkaline metal and L: diatomic metal), and glass material constituting the cladding, which comprises fluorine crown glass containing silicon dioxide ($SiO_2$), boric oxide ($B_2O_3$) and fluorine compound. This method can make the direct bonding easy so as to increase bonding strength at the interface, and produce highly reliable optical waveguide.

Also, method of manufacturing an optical waveguide employs glass materials constituting both the core segment and the cladding, which comprise fluorine crown glass containing silicon dioxide ($SiO_2$), boric oxide ($B_2O_3$) and fluorine compound, and a combination of these materials are so selected that a refraction factor of the core segment is greater than that of the cladding. This method can also make the direct bonding easy so as to Increase bonding strength at the interface, and produce highly reliable optical waveguide.

Moreover, a method of manufacturing an optical waveguide includes the step of direct bonding only after both bonding surfaces of the lower cladding layer and the core layer are polished to 0.1 nm to 1 nm in arithmetic mean surface roughness (Ra) and 0.1 $\mu$m to 1 $\mu$m in flatness throughout the entire surface areas of the substrate being bonded. This method can thus ensure the direct bonding over the entire surfaces even though it uses a substrate of 3 inches or larger In diameter, for instance, so as to allow manufacturing of optical waveguides with high productivity. In this method, 1 nm or less in the surface roughness Ra can establish reliable interatomic bonding between glass components of the substrate, and 1 $\mu$m or less in flatness can make uniform contact of the substrate over the entire surface areas, thereby ensuring reliability and consistency In the direct bonding.

DETAILED DESCRIPTION OF THE PREFERRED EMBODIMENTS

Referring now to the accompanying drawings, detailed descriptions will be provided hereinafter of optical waveguides and methods of manufacturing the same according to the preferred embodiments of the present invention.

(First Exemplary Embodiment)

Figure 1:
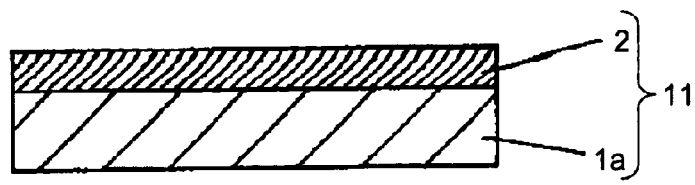
FIGS. 1(a)–(g) illustrates processing diagrams showing an optical waveguide and a method of manufacturing the same according to a first exemplary embodiment of the present invention.
Figure 1:
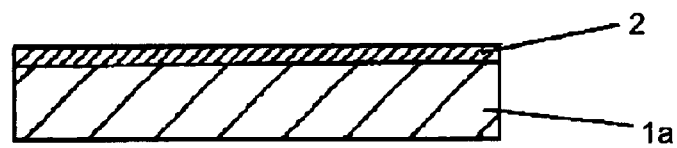
Figure 1:
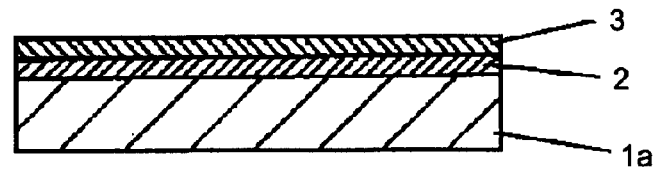
Figure 1:
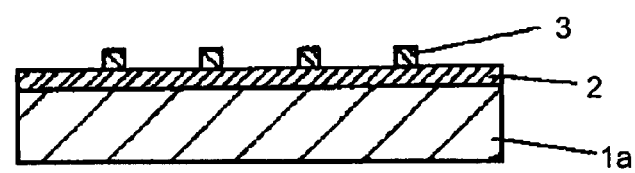
Figure 1:
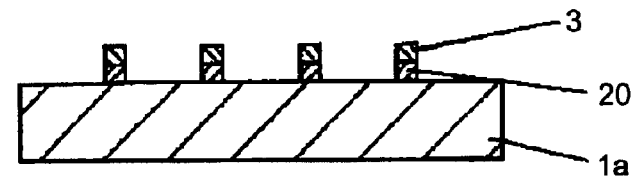
Figure 1:
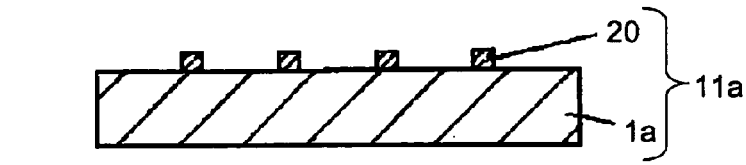
Figure 1:
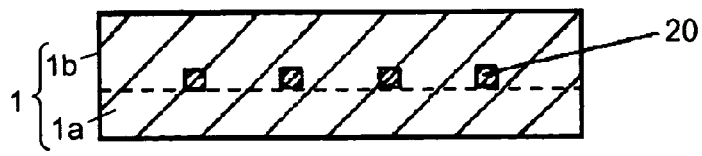

FIGS. 1(a)–(g) illustrates processing diagrams for manufacturing an optical waveguide according to the first exemplary embodiment of the present invention. A circular shape fluorine crown glass of 3 inches in diameter, as a substrate constituting lower cladding layer 1a, and a borosilicate crown glass of the same shape, as another substrate constituting core layer 2 were directly bonded together. FIG. 1(a) shows an appearance of the bonded state. The direct bonding is made in the following manner. First, one surface of each of the glass substrates is optically polished to such an extent that it becomes 1 nm in arithmetic mean surface roughness (Ra) and 1 $\mu$m in flatness. After that, these glass substrates are rinsed to a level of cleanliness that a contact angle of water to these glass substrates is 5 degrees or less. Next, after the polished surfaces of these glass substrates are abutted and pressed against each other, they are heat-treated at 250 ° C. for one hour to bond the lower cladding layer 1a and the core layer 2 directly In the atomic level, and to form Integrated bonded substrate 11. In the direct bonding, when hyaline surfaces of oxide such as glass substrates are normalized in the atomic level and heat-treated while being abutted and pressed against each other, there is produced bonding of atoms of the glass substrate components via oxygen atoms, to gain an interface as strong as a solid bulk. According to the direct bonding as described, integration of materials can be made easily without using any adhesive agent even when they are large in diametral size and different materials containing different compositions.

Next, a surface of the core layer 2 is ground and polished to a final thickness of 5 to 7 $\mu$m, as shown in FIG. 1(b). The core layer 2 is then coated with photoresist 3 by the spin-coating method, as shown in FIG. 1(c). Afterwards, the photoresist 3 is patterned by the photolithography method as shown in FIG. 1(d), and the unnecessary portion of the core layer 2 is removed by dry etching as shown in FIG. 1(e). This obtains substrate 11a provided with core segments 20 of a predetermined shape formed on the lower cladding layer 1a, when the photoresist 3 is removed thereafter.

Following the above, upper cladding layer 1b is formed by depositing fluorine crown glass with the sputtering method on the surface where the core segments 20 are formed as shown in FIG. 1(f) using as a target the same fluorine crown glass as the lower cladding layer 1a. Since the lower cladding layer 1a and the upper cladding layer 1b are formed of the same material, they are integrated into one body to form cladding 1, so as to obtain the optical waveguide in which core segments 20 are buried Into the cladding 1. This is shown in FIG. 1(g).

For a first experiment sample, lower cladding layer 1a was formed using fluorine crown glass having a glass yield point of 568° C., a refraction factor of 1.4876, a coefficient of thermal expansion of 95×10$^{-7}$/° C., and composed of $SiO_2$, $B_2O_3$, $K_2O$ and $KHF_2$. Also, core layer 2 was formed using borosilicate crown glass having a glass yield point of 625° C., a refraction factor of 1.5164, a coefficient of thermal expansion of 86×10$^{-7}$/° C., and composed of $SiO_2$, $B_2O_3$, $Na_2O$, $K_2O$ and $BaO$. These glass substrates are circular shape, and each has 1 mm in thickness and 3 inches in diameter.

After each of surfaces to be abutted was optically polished to a surface roughness (Ra) of 1 nm and flatness of 1 $\mu$m, and rinsed to such cleanliness that a contact angle of water to the glass substrate becomes 5 degrees or less, the polished surfaces were abutted and pressed upon each other, and subjected to a heat treatment at 250° C. for 1 hour to bond them directly. The borosilicate crown glass constituting core layer 2 was then ground and polished until it became 7 $\mu$m thick. Next, photoresist 3 was formed on the borosilicate crown glass, and it was patterned by exposing it to light through a mask pattern placed thereon and by developing it thereafter. Using the patterned photoresist 3 as a mask, the core layer 2 was subjected to the reactive Ion etching, to form core segments 20 of 7 $\mu$m square in cross-sectional shape. Subsequently, fluorine crown glass of the same composition as the lower cladding layer 1a was sputtered to a thickness of 20 $\mu$m, which formed upper cladding layer 1b, and thus completed the optical waveguides.

Both the lower cladding layer 1a and the upper cladding layer 1b were made of the same material having the same optical characteristics, and they composed integrated cladding 1. The sample produced as above has designated as the first experiment sample.

The optical waveguides of this first experiment sample has an absolute value of 9×10$^{-7}$/° C. in difference of coefficient of thermal expansion between the core segments 20 and the cladding 1 ($\alpha$1–$\alpha$2). However, the sample has a substantially high bonding strength in the directly bonded interface between the core segments 20 and the cladding 1, that it did not show any sign of separation at all. In addition, since the lower cladding layer 1a and the core segments 20 are covered sufficiently with the upper cladding layer 1b formed by the sputtering, there were not observed any air bubbles which are liable to be trapped in any of the interfaces between the core segments 20 and the lower cladding layer 1a, and between the core segments 20 and the upper cladding layer 1b.

In addition, it is necessary that a plurality of the optical waveguides produced In the circular shape glass substrate of 3-inch diameter are cut into individual segments, and ends of the core segments 20 are also cut by a dicer or the like to expose their surfaces in order to connect them with optical fibers. If there is a large difference in the coefficient of thermal expansion between the core segments 20 and the cladding 1, it is likely that a break or a crack can occur in the core segments 20, cladding 1, and especially around their interfacial areas during this process. However, such a defect did not occur in the optical waveguides of the first experiment sample.

As a second experiment sample, circular shape fluorine crown glass substrates having 3 inches in diameter and 1 mm in thickness were used for core layer and lower cladding layer 1a. However, the fluorine crown glass used for the lower cladding layer 1a has a glass yield point of 491° C., a refraction factor of 1.4816, a coefficient of thermal expansion of 95×10$^{-7}$/° C., and is composed of $SiO_2$, $B_2O_3$, $AlF_3$, $K_2O$ and $Na_2O$. Also, the fluorine crown glass used for the core layer 2 has a glass yield point of 568° C., a refraction factor of 1.4876, a coefficient of thermal expansion of $95 \times 10^{-7}/°$ C., and composed of $SiO_2$, $B_2O_3$, $K_2O$ and KF. The optical waveguides were produced using these glass substrates in the same method and conditions as those of the first experiment sample. The sample produced in the manner as described above has designated as the second experiment sample.

There was not any warp and separation at the directly bonded interface, nor were any air bubbles trapped around the same interface between the core segments 20 and the cladding 1 in the optical waveguides of the second experiment sample. In addition, no break or crack occurred during the process of dicing.

For the purpose of comparison with the above experiment samples, fluorine crown glass of 3 inches in diameter and 1 mm in thickness was used as lower cladding layer 1a, and borosilicate crown glass of the same shape as core layer 2. The fluorine crown glass used for the lower cladding layer 1a has a glass yield point of 495° C., a refraction factor of 1.5112, a coefficient of thermal expansion of $100 \times 10^{-7}/°$ C., and composed of $SiO_2$, KF, and $K_2O$. Also, the borosilicate crown glass used for the core layer 2 has a glass yield point of 625° C., a refraction factor of 1.5164, a coefficient of thermal expansion of $86 \times 10^{-7}/°$ C., and composed of $SiO_2$, $B_2O_3$, $Na_2O$, $K_2O$ and BaO. Optical waveguides were produced using these glass substrates in the same method and conditions as those of the first experiment sample. The optical waveguides produced as above Is designated first comparison sample.

In the case of first comparison sample, these optical waveguides showed an absolute value of $14 \times 10^{-7}/°$ C. in difference of coefficient of thermal expansion between the core segments 20 and the cladding 1 ($\alpha 1 - \alpha 2$).

During the process of direct bonding for these optical waveguides, there was not observed any warp in the substrate, no separation at the interface between the core layer 2 and the lower cladding layer 1a, nor were air bubbles trapped around the same interface between the core segments 20 and the cladding 1, as were the cases of the first experiment sample and the second experiment sample. However, a crack occurred during dicing in part of the interfaces between the core segments 20 and cladding 1.

Table 1 shows results of these three different samples.

TABLE 1

|  | 1st Experiment Sample | 2nd Experiment Sample | 1st Comparison Sample |
| --- | --- | --- | --- |
| Yield point (° C.) |  |  |  |
| Cladding | 568 | 491 | 495 |
| Core segments | 625 | 568 | 625 |
| Coefficient of thermal expansion ($\times 10^{-7}/°$ C.) |  |  |  |
| Cladding | 95 | 95 | 100 |
| Core segments | 86 | 95 | 86 |
| Refraction factor |  |  |  |
| Cladding | 1.4876 | 1.4816 | 1.5112 |
| Core segments | 1.5164 | 1.4876 | 1.5164 |
| $\alpha 1 - \alpha 2$ ($\times 10^{-7}/°$ C.) | 9 | 0 | 14 |

TABLE 1-continued

|  | 1st Experiment Sample | 2nd Experiment Sample | 1st Comparison Sample |
| --- | --- | --- | --- |
| Difference in Yield point (° C.) | 57 | 77 | 130 |

As is obvious from Table 1, the value ($\alpha 1 - \alpha 2$) of the first experiment sample is $9 \times 10^{-7}/°$ C., the value ($\alpha 1 - \alpha 2$) of the second experiment sample Is 0, and the value ($\alpha 1 - \alpha 2$) of the first comparison sample is $14 \times 10^{-7}/°$ C. On the other hand, the first comparison sample was the only one in which a crack was observed after it was subjected to the processes of direct bonding, dicing, and the like. In addition, Optical waveguides of like shape were produced by using a variety of materials having different coefficients of thermal expansion according to the same manufacturing method as described above, and they were examined for cracks, separations, and presence of air bubbles. As a result, cracks were found to have occurred during dicing at least on those optical waveguides that have differences ($\alpha 1 - \alpha 2$) of the coefficient of thermal expansion equal to or greater than $10 \times 10^{-7}/°$ C. However, no abnormality of cracks or the like was observed on those waveguides having values of $9 \times 10^{-7}/°$ C. or less.

According to the above results, it was found that the difference of coefficient of thermal expansion between the core layer 2 and the cladding 1 is desirably within a range of 0 and $9 \times 10^{-7}/°$ C. in order to manufacture the optical waveguides by making direct bonding between lower cladding layer 1a and core layer 2 and forming upper cladding layer 1b by sputtering.

(Second Exemplary Embodiment)

Figure 2A:
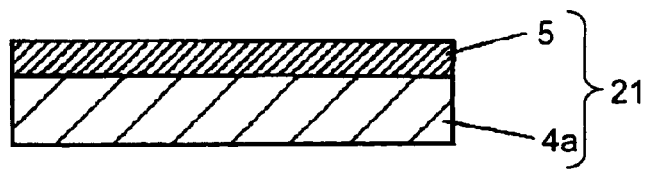
FIGS. 2(a)–(h) illustrates processing diagrams showing another optical waveguide and a method of manufacturing the same according to a second exemplary embodiment of the present invention.

FIGS. 2(a)–(h) illustrates processing diagrams for manufacturing an optical waveguide according to the second exemplary embodiment of the present invention. A circular shape fluorine crown glass of 3 inches in diameter, as a substrate constituting lower cladding layer 4a, and another fluorine crown glass of the same shape, as a substrate constituting core layer 5 were put together by direct bonding. FIG. 2(a) shows an appearance of the bonded state. The method of making the direct bonding is the same as that described in the first exemplary embodiment, and details are therefore skipped. Bonding directly the core layer 5 and the lower cladding layer 4a obtains bonded substrate 21 in which the core layer 5 and the lower cladding layer 4a are Integrated into one body.

Figure 2B:
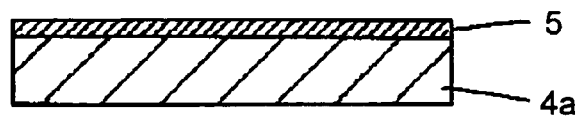
Figure 2C:
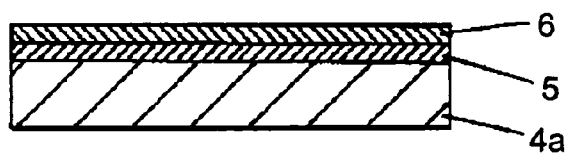
Figure 2D:
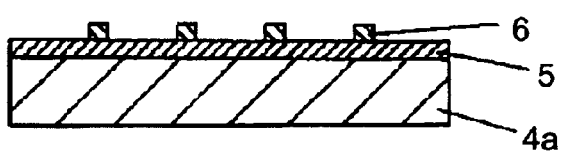
Figure 2E:
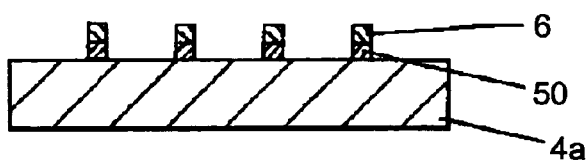
Figure 2F:
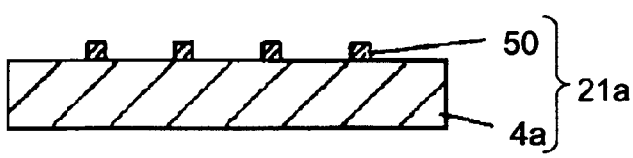

Next, a surface of the core layer 5 is ground and polished until a thickness of the core layer 5 becomes 5 to 7 μm, as shown in FIG. 2(b). The core layer 5 is then coated with photoresist 6 by the spin-coating method, as shown in FIG. 2(c). Afterwards, the photoresist 6 is patterned by the photolithography method as shown in FIG. 2(d), and the unnecessary portion of the core layer 5 is removed by dry etching. This is shown in FIG. 2(e). Removal of the photoresist 6 now obtains substrate 21a provided with core segments 50 formed thereon. This is shown in FIG. 2(f).

Figure 2G:
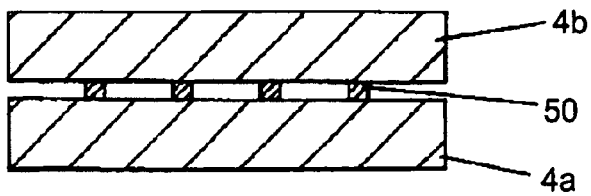
Figure 2H:
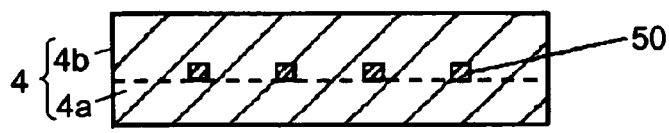
Figure 3A:
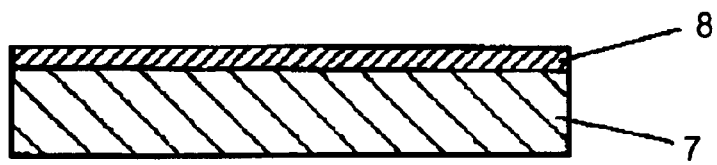
FIGS. 3(a)–(c) illustrates processing diagrams showing a method of manufacturing an optical waveguide using the flame deposition hydrolysis method of the prior art.
Figure 3B:
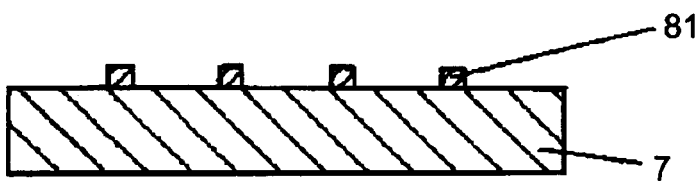
Figure 3C:
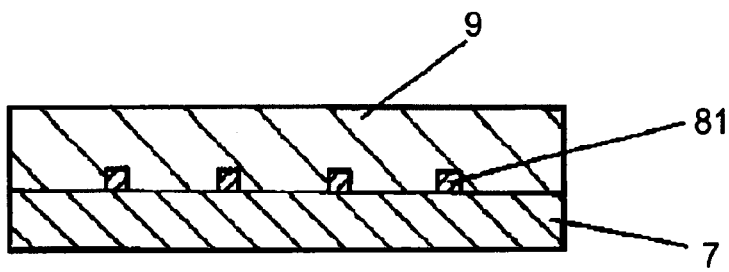

Prepared thereafter is upper cladding layer 4b made of fluorine crown glass, which is the same material as the lower cladding layer 4a. After the upper cladding layer 4b is placed on top of the core segments 50 as shown in FIG. 2(g), it Is hot pressed at a temperature higher than the glass yield point of the upper cladding layer 4b by 20 to 30° C. to bury the core segments 50 and to form cladding 4 by integrating the lower cladding layer 4a and the upper cladding layer 4b into one body.

For this hot pressing, it is necessary that a combination of the glass materials is so chosen as to satisfy the formula of At1−At2>70, where At1 denotes a yield point of the glass material constituting the core layer 5 and At2 denotes that of the glass material constituting the cladding. With this combination, it is possible to set a range of the heating temperature that can avoid the core segments 50 from warping during the hot pressing, and facilitate integration of the upper cladding layer and the lower cladding layer.

For a third experiment sample, fluorine crown glasses of 3 inches in diameter and 1 mm in thickness were used as the core layer 5 and the lower cladding layer 4a, after one side surface of each of them was optically polished and rinsed. However, the fluorine crown glass used for the lower cladding layer 4a has a yield point (At2) of 491° C., a refraction factor of 1.4816, a coefficient of thermal expansion ($\alpha 2$) of $95\times 10^{-7}$/° C., and is composed of $SiO_2$, $B_2O_3$, $AlF_3$, $K_2O$ and $Na_2O$. Also, the fluorine crown glass used for the core layer 5 has a yield point (At1) of 568° C., a refraction factor of 1.4876, a coefficient of thermal expansion ($\alpha 1$) of $95\times 10^{-7}$/° C., and composed of $SiO_2$, $B_2O_3$, $K_2O$ and KF. The polished surface of the lower cladding layer 4a and the polished surface of the core layer 5 were abutted and pressed upon each other, and subjected to a heat treatment at 250° C. for 1 hour to bond them directly. Roughness (Ra) and flatness of the surfaces after being optically polished, and a contact angle of water to the substrate after rinsing were in the same degrees as those of the first exemplary embodiment.

The core layer 5 was then ground and polished until the thickness became 7 $\mu$m. Following the above, the core layer 5 was coated with photoresist 6, and it was exposed to light in a prescribed manner to pattern-form the photoresist 6. Using the patterned photoresist 6 as a mask, the core layer 5 was dry-etched to form core segments 50 of approximately 7 $\mu$m square in cross-sectional shape.

Subsequently, the upper cladding layer 4b composed of the same glass material as the lower cladding layer 4a was placed on top of the core segments 50, and it was hot-pressed at 520° C. for 30 seconds. The hot press causes the upper cladding layer 4b to deform in a manner to bury the core segments 50 into it until it comes into contact with the lower cladding layer 4a, and to form the optical waveguides when the upper cladding layer 4b and the lower cladding layer 4a are integrated to become cladding 4. The sample thus produced was designated as the third experiment sample.

The optical waveguides of the third experiment sample did not cause deformation of the core segments 50, and retained an excellent precision in shape even after they were subjected to the hot pressing. Moreover, there was not any warp of the substrate or separation at the bonded interface, nor were any air bubbles trapped around the same interface between the core segments 50 and the cladding even after the processes of direct bonding, subsequent hot-pressing, and the like.

For a fourth experiment sample, fluorine crown glass of 3 inches In diameter and 1 mm in thickness was used as the lower cladding layer 4a, after one side surface was optically polished and rinsed. Also, borosilicate crown glass of the same shape and rinsed in the same way was used as the core layer 5. However, the fluorine crown glass used for the lower cladding layer 4a has a yield point (At2) of 447° C., a refraction factor of 1.4644, a coefficient of thermal expansion ($\alpha 2$) of $93\times 10^{-7}$/° C., and composed of $SiO_2$, $B_2O_3$, $K_2O$ and $KHF_2$. Also, the borosilicate crown glass used for the core layer 5 has a yield point (At1) of 625° C., refraction factor of 1.5164, a coefficient of thermal expansion ($\alpha 1$) of $86\times 10^{-7}$/° C., and composed of $SiO_2$, $B_2O_3$, $Na_2O$, $K_2O$ and BaO. Although the optical waveguides were produced with these glass materials, same conditions were used as those of the third experiment sample except that the hot press was given at 470° C. The sample thus produced has designated as the fourth experiment sample.

The optical waveguides of the fourth experiment sample did not cause warp and separation, nor were any air bubbles trapped around the interface between the core segments 50 and the cladding 4 even after the processes of direct bonding, subsequent hot-pressing and the like. Moreover, there was not any break, crack or the like due to the dicing. Furthermore, the core segments 50 did not deform by the heat after being subjected to the hot press at 470° C., and retained an excellent precision in shape.

Next, samples of optical waveguide were produced as a second comparison sample for the purpose of comparison with the above experiment samples. Fluorine crown glass of 3 inches in diameter and 1 mm in thickness was used for the lower cladding layer 4a, after one side surface was optically polished and rinsed. Also, borosilicate crown glass of the same shape and processed in the same way was used for the core layer 5. However, the fluorine crown glass used for the lower cladding layer 4a has a yield point (At2) of 568° C., a refraction factor of 1.4876, a coefficient of thermal expansion ($\alpha 2$) of $95\times 10^{-7}$/° C., and composed of $SiO_2$, $B_2O_3$, $K_2O$ and $KHF_2$. Also, the borosilicate crown glass used for the core layer 5 has a yield point (At1) of 625° C., refraction factor of 1.5164, a coefficient of thermal expansion ($\alpha 1$) of $86\times 10^{-7}$/° C., and composed of $SiO_2$, $B_2O_3$, $Na_2O$, $K_2O$ and BaO.

Although the optical waveguides were produced with these glass materials, same conditions were used as those of the third experiment sample except that the hot press was given at 590° C.

The optical waveguides produced as above did not cause warp of the substrate and separation in the interface, nor was any break, crack or the like due to the dicing even after the manufacturing processes of direct bonding, subsequent hot-pressing and the like. Moreover, the core segments 50 did not deform by the heat after being subjected to the hot press, and retained an excellent precision in shape. However, there were air bubbles trapped around the interfaces between the core segments 50 and the upper cladding layer 4b as well as between the lower upper cladding layer 4a and the upper cladding layer 4b, Indicating deficiency in integration of the cladding by the hot press.

Next, as a third comparison sample, fluorine crown glass of 3 inches in diameter and 1 mm in thickness having one side surface optically polished and rinsed was used as the lower cladding layer 4a, and borosilicate crown glass of the same shape and processed in the same way was used as the core layer 5. The fluorine crown glass used for the lower cladding layer 4a has a yield point (At2) of 495° C., a refraction factor of 1.5112, coefficient of thermal expansion ($\alpha 2$) of $100\times 10^{-7}$/° C., and composed of SiO2, KF and $K_2O$. Also, the borosilicate crown glass used for the core layer 5 has a yield point (At1) of 625° C., refraction factor of 1.5164, coefficient of thermal expansion ($\alpha 1$) of $86\times 10^{-7}$/° C., and composed of $SiO_2$, $B_2O_3$, $Na_2O$, $K_2O$ and BaO. Although the optical waveguides were produced with these glass materials, the same manufacturing conditions were used as those of the third experiment sample. The sample thus produced is designated third comparison sample.

The optical waveguide produced as above showed no thermal deformation on the core segments 50 even after they were hot-pressed, and retained an excellent precision in shape. Also, it did not show any warp and separation of the substrate even after the processes of direct bonding, hot-pressing and the like. In addition, no air bubbles were observed around the interfaces between the core segments 50 and the upper cladding layer 4b, or between the upper cladding layer 4b and the lower upper cladding layer 4a, as have occurred in the second comparison sample due to deficiency in the cladding integration by the hot press. However, partial cracks were found in the interface between the core segments 50 and the cladding 1 during the dicing.

Table 2 shows results of these four different samples.

TABLE 2

| | Third Experiment Sample | Fourth Experiment Sample | Second Comparison Sample | Third Comparison Sample |
|---|---|---|---|---|
| Yield point (° C.) | | | | |
| Cladding | 491 | 447 | 568 | 495 |
| Core segments | 568 | 625 | 625 | 625 |
| Coefficient of thermal expansion ($\times 10^{-7}/°$ C.) | | | | |
| Cladding | 95 | 93 | 95 | 100 |
| Core segments | 95 | 86 | 86 | 86 |
| Refraction factor | | | | |
| Cladding | 1.4816 | 1.4644 | 1.4876 | 1.5112 |
| Core segments | 1.4876 | 1.5164 | 1.5164 | 1.5164 |
| $\alpha 1 - \alpha 2$ ($\times 10^{-7}/°$ C.) | 0 | 7 | 9 | 14 |
| Difference in Yield point (° C.) | 77 | 178 | 57 | 130 |

As is obvious from Table 2, the third experiment sample and the fourth experiment sample were the only samples that exhibited good precision in shape and did not cause any crack, separation or the like. These samples have a difference ($\alpha 1 - \alpha 2$) of $7 \times 10^{-7}/°$ C. or less in the coefficient of thermal expansion and a difference of 77°C. or higher in the yield point. On the other hand, the second comparison sample has a difference in the yield point of only 57° C., while a difference in the coefficient of thermal expansion ($\alpha 1-2$) is $9 \times 10^{-7}/°$ C. Further, although the third comparison sample has a large difference of 130° C. in the yield point, it also has a large difference ($\alpha 1-\alpha 2$) of $14 \times 10^{-7}/°$ C. in the coefficient of thermal expansion. These differences in the coefficient of thermal expansion and the yield point were examined to determine how they affect preciseness of shape, cracks and the like.

In the second comparison sample, although there was not any warp of the substrate and separation in the interface, nor was there any crack due to dicing even after the manufacturing processes of direct bonding, hot-pressing and the like, there were air bubbles trapped around the interfaces between the core segments 50 and the upper cladding layer 4b. Presence of the air bubbles is ascribed to deficiency of the hot press. Therefore, cladding tightness can be improved and the air bubbles prevented to develop If the hot-press temperature Is raised. On the other hand, raising the temperature substantially impairs preciseness of forming shape of the core segments 50.

In light of the difference In yield point for the possibility of improving the cladding tightness with the hot press while ensuring a level of preciseness in the shape, another examination was made for a condition of air-bubble trapping by using combinations of glass materials having a variety of different yield points. It was found as a result that a difference of 70° C. or higher In temperature of the yield point is needed between the upper cladding layer 4b and the core segments 50. In other words, it was determined that deformation on the core segments 50 can be avoided and excellent bonding tightness is ensured in their interface if there is a difference of 70° C. or higher in the temperature, since the hot-press temperature can be set to a value higher than the yield point of the upper cladding layer 4b by 20 to 30° C. but lower than the yield point of the core segments 50. That is, in this manufacturing method for directly bonding the core layer 5 and the lower cladding layer 4a, and integrating the upper cladding layer 4b into one body with the lower cladding layer 4a by the hot press In a manner to bury the core segments 50 therein, It is necessary to arrange an absolute value of the difference in the coefficient of thermal expansion ($\alpha 1-\alpha 2$) in a range of 0 to $9 \times 10^{-7}/°$ C. and a difference of 70° C. or higher in the yield point.

In these exemplary embodiments, although the descriptions were provided of the cases in which sodium (Na) and potassium (K) are given as examples of the alkaline metal for the borosilicate crown glass, lithium (Li) may also be used. In addition, although the above descriptions were provided of the case of barium (Ba) as the diatomic metal, it may be any of magnesium (Mg), calcium (Ca) and strontium (Sr). Moreover, although the lower cladding layer and the upper cladding layer were composed by using the same material in these exemplary embodiments, they can be of different compositions so long as they are fluorine crown glasses of the same kind. Furthermore, although the above descriptions were provided of the cases in which fluorine compound $KHF_2$ and KF were used as a component of the fluorine crown glasses, this invention is not restrictive to these materials, and they may be substituted with any of $MgF_2$, $CaF_2$, $SrF_2$, $BaF_2$, LiF, NaF, and the like.

INDUSTRIAL APPLICABILITY

As has been described, an optical waveguide and a method of manufacturing the same according to the present invention relates to a structure in which glass substrates are bonded directly In the interatomic level, and core segments are buried into a cladding when an upper cladding layer is formed by means of sputtering or hot pressing. The invented method provides advantages of reducing a number of the manufacturing processes, shortening the processing time, and manufacturing easily the optical waveguide having excellent characteristics.

REFERENCE NUMERALS IN THE DRAWINGS

1, 4 Cladding
1a, 4a Lower cladding layer
1b, 4b, 9 Upper cladding layer
2, 5, 8 Core layer
3, 6 Photoresist layer
7 Quartz substrate
11, 21 Bonded substrate
11a, 21a Bonded substrate with core segments
20, 50, 81 Core segment

What is claimed is:

1. An optical waveguide comprising:
   a cladding constituting a second glass material; and
   a core segment constituting a first glass material buried in said cladding;
   wherein:
   said first glass material comprises borosilicate crown class comprising silicon dioxide, boric oxide, an alkaline metal oxide of the formula $R_2O$ in which R is an alkali metal, and a diatomic metal oxide of the formula LO in which L is a diatomic metal;
   said second glass material comprises fluorine crown glass comprising silicon dioxide, boric oxide, an alkaline metal oxide of the formula $R_2O$ in which R is an alkali metal, and a fluorine containing compound;
   said first glass material, having a coefficient of thermal expansion $\alpha 1$, and said second glass material, having a coefficient of thermal expansion, $\alpha 2$, are combined so that an absolute value of difference in coefficient of thermal expansion between said glass materials, ($\alpha 1 - \alpha 2$), is within a range of 0 and $9 \times 10^{-7}/°$ C., and
   where $\alpha 1$ and At1 respectively denote the coefficient of thermal expansion and the yield point of said first glass material, and $\alpha 2$ and At2 respectively denote the coefficient of thermal expansion and the yield point of said second glass material.

2. The optical waveguide according to claim 1, wherein said glass material constituting said core segment comprises borosilicate crown glass having a composition of silicon dioxide ($SiO_2$), boric oxide ($B_2O_3$), alkaline metal oxide ($R_2O$) and diatomic metal oxide (LO) (R: alkaline metal and L: diatomic metal), and said another glass material constituting said cladding comprises fluorine crown glass having a composition of silicon dioxide ($SiO_2$), boric oxide ($B_2O_3$) and fluorine compound.

3. The optical waveguide according to claim 1, wherein said glass materials constituting both said core segment and said cladding comprise fluorine crown glass having a composition of silicon dioxide ($SiO_2$), boric oxide ($B_2O_3$) and fluorine compound, and a combination of said glass materials is so arranged that a refraction factor of said core segment is greater than a refraction factor of said cladding.

4. The optical waveguide of claim 1 wherein R is sodium, potassium or lithium, and L is barium, magnesium, calcium, or strontium.

5. A method of manufacturing an optical waveguide, the method comprising the steps of:
   forming a bonded substrate by pressing and heating a glass plate constituting a lower cladding layer and another glass plate constituting a core layer arranged in a manner that optically polished surfaces thereof abut against each other, to make direct bonding;
   finishing a surface of said core layer of said bonded substrate by one of grinding and polishing, to obtain a thickness appropriate for a core segment;
   forming said core segment defining the waveguide by etching said core layer; and
   forming an upper cladding layer by making a film with sputtering over said lower cladding layer, including said core segment, while burying said core segment at the same time into a cladding comprised of said upper cladding layer and said lower cladding layer;
   wherein said optically polished surfaces are polished to 0.1 nm to 1 nm in arithmetic mean surface roughness, Ra, and 0.1 μm to 1 μm in flatness throughout the entire surface area.

6. The method manufacturing an optical waveguide according to claim 5, wherein said glass material constituting said core segment comprises borosilicate crown glass containing silicon dioxide, boric oxide, an alkaline metal oxide of the formula ($R_2O$) in which R is an alkali metal, and a diatomic metal oxide of the formula LO in which L is a diatomic metal, and said another glass material constituting said cladding comprises fluorine crown glass containing silicon dioxide, boric oxide, an alkaline metal oxide of the formula ($R_2O$) in which R is an alkali metal, and a fluorine containing compound.

7. The method of manufacturing an optical waveguide according to claim 5, wherein said glass materials constituting both said core segment and said cladding each comprise fluorine crown glass containing silicon dioxide, boric oxide, an alkaline metal oxide of the formula ($R_2O$) in which R is an alkali metal, and a fluorine compound, and a combination of said glass materials is so arranged that a refraction factor of said core segment is greater than a factor of said cladding.

8. The method manufacturing an optical waveguide according to claim 5, wherein glass plate constituting said core layer comprises borosilicate crown glass comprising silicon dioxide, boric oxide, an alkaline metal oxide of the formula $R_2O$ in which R is an alkali metal, and a diatomic metal oxide of the formula LO in which L is a diatomic metal; and said glass plate constituting said lower cladding layer comprises fluorine crown glass comprising silicone dioxide, boric oxide, an alkaline metal oxide of the formula $R_2O$ in which R is an ankali metal, and a flourine containing compound.

9. The manufacturing an optical waveguide according to claim 8, wherein R is sodium, potassium or lithium and L is barium magnesium, calcium, or strontium.

10. The method of manufacturing an optical waveguide according to claim 8 or claim 9, wherein the fluorine containing compound is $KHF_2KF$, $MgF_2$, $CaF_2SrF_2$, $BaF_2$, LiF, or NaF.

11. A method of manufacturing an optical waveguide, the method comprising the steps of:
   forming a bonded substrate by pressing and heating a glass plate constituting a lower cladding layer and another glass plate constituting a core layer arranged in a manner that optically polished surfaces thereof abut against each other, to make direct bonding;
   finishing a surface of said core layer of said bonded substrate by one of grinding and polishing, to obtain a thickness appropriate for a core segment;
   forming said core segment defining the waveguide by etching said core layer; and
   arranging on said core segment an upper cladding layer of glass plate having a yield point lower than a yield point of said core segment, and hot-pressing said upper cladding layer by means of heating and pressing at a temperature at least equal to or higher than the yield point of said upper cladding layer, to bond together said upper cladding layer and said lower cladding layer into an integral body defining a cladding and to bury said core segment at the same time into said cladding while retaining an original shape of said core segment;
   wherein:
   a refraction factor of said first glass material is higher than the refraction factor of said second glass material;
   an absolute value of difference in coefficient of thermal expansion between said first glass material and said second glass material, $\alpha 1 - \alpha 2$, is within a range of 0 and $9 \times 10^{-7}/°$ C.; and the yield point of said first glass material, At1, is higher than the yield point of said second-glass material, At2. by 70° C. or greater, where α1 and At1 respectively denote the coefficient of thermal expansion and the yield point of said first glass material, and α2 and At2 respectively denote the coefficient of thermal expansion and the yield point of said second glass material;

wherein said optically polished surfaces are polished to 0.1 nm to 1 nm in arithmetic mean surface roughness, Ra, and 0.1 αm to 1 αm in flatness throughout the entire surface area;

12. The method of manufacturing a of optical waveguide according to claim 11, where said step of hot pressing includes heating at a temperature higher than the yield point of said second glass material constituting said lower cladding layer but low the yield point of said first glass material constituting said core segment.

13. The method of manufacturing optical waveguide according to claim 12, wherein said glass material constituting said core segment comprises borosilicate crown glass containing silicon dioxide ($SiO_2$), boric oxide ($B_2O_3$), alkaline metal oxide ($R_2O$) and diatomic metal oxide (LO) (R: alkaline metal and L: diatomic metal, and said another glass material constituting said cladding comprises fluorine crown glass containing silicon dioxide ($SiO_2$), boric oxide ($B_2O_3$) and fluorine compound.

14. The method manufacturing optical waveguide according to claim 12, wherein said glass materials constituting both said core segment and said cladding comprise fluorine crown glass containing silicon dioxide ($SiO_2$), boric oxide ($B_2O_3$) and fluorine compound, and a combination of said glass materials is so arranged that a refraction factor of said core segment is greater than a refraction factor of said cladding.

15. The method of manufacturing optical waveguide according to claim 11, wherein said glass material constituting said core segment comprises borosilicate crown glass containing silicon dioxide ($SiO_2$), boric oxide ($B_2O_3$, alkaline metal oxide ($R_2O$) and diatomic metal oxide (LO) (R: alkaline metal and L: diatomic metal), and said another glass material constituting said cladding comprises fluorine crown glass containing silicon dioxide ($SiO_2$), boric oxide ($B_2O_3$) and fluorine compound.

16. The method of manufacturing optical waveguide according to claim 11, wherein said glass materials constituting both said core segment and said cladding comprise fluorine crown glass containing silicon dioxide ($SiO_2$) boric oxide ($B_2O_3$) and fluorine compound, and a combination of said glass materials is so arranged that a refraction factor of said core segment is greater than a refraction factor of said cladding.

17. The method of manufacturing optical waveguide according to claim 11, wherein said direct bonding is made only after both bonding surfaces of said lower cladding layer and said core layer are polished to 0.1 nm to 1 nm in arithmetic mean surface roughness (Ra) and 0.1 μm in flatness throughout the entire areas of said substrate being bonded.

18. The method of manufacturing an optical waveguide according to claim 11, wherein glass plate constituting said core layer comprises borosillicate crown glass comprising silicon dioxide, boric oxide, an alkaline metal oxide of the formula $R_2O$ in which R is an alkali metal, and a diatomic metal oxide of the formula LO in which L is a diatomic metal; and said glass plate constituting said lower cladding layer comprises fluorine crown glass comprising silicon dioxide, boric oxide, an alkaline metal oxide of the formula $R_2O$ in which R is an alkali metal, and a fluorine containing compound.

19. The method of manufacturing an optical waveguide according to claim 18 or claim 16, wherein the fluorine containing compound is $KHF_2$, KF, $MgF_2$, $CaF_2$, $SrF_2$, $BaF_2$, LiF, or NaF.

20. The method of manufacturing an optical waveguide according to claim 18, wherein R is sodium, potassium or lithium, and L is barium, magnesium, calcium, or strontium.

21. An optical waveguide comprising:
a cladding constituting a second glass material; and
a core segment constituting a first glass material buried in said cladding;
wherein:
said first glass material and second glass material each comprise fluorine crown glass comprising silicon dioxide, boric oxide, an alkaline metal oxide of the formula $R_2O$ in which R is an alkali metal, and a fluorine containing compound;
a refraction factor of said first glass material is higher than the refraction factor of said second glass materials;

22. The optical waveguide of claim 21 wherein R is sodium, potassium or lithium, and L is barium, magnesium, calcium, or strontium.

23. The optical waveguide according to claim 4 or claim 22, wherein the fluorine containing compound is $KHF_2$F, KF, $MgF_2$, $CaF_2$, $SrF_2$, $BaF_2$, LiF, or NaF.

* * * * *

UNITED STATES PATENT AND TRADEMARK OFFICE
CERTIFICATE OF CORRECTION

PATENT NO. : 6,996,324 B2
APPLICATION NO. : 10/432920
DATED : February 7, 2006
INVENTOR(S) : Masahiro Hiraka et al.

It is certified that error appears in the above-identified patent and that said Letters Patent is hereby corrected as shown below:

Title Page, Item (56) References Cited, OTHER PUBLICATIONS
Change "Catakig.pdf." to --Catalog.pdf.--

Page 2, Item (56) References Cited. OTHER PUBLICATIONS
Change "Engllsh" --English--

Title Page, Item (57) ABSTRACT
Replace the Abstract with the following Abstract

--An optical waveguide comprises a cladding layer and a core segment buried in the cladding layer and serving as a waveguide. A combination of glass material constituting the core segment and another glass material constituting the cladding layer is selected so that an absolute value of a difference in a coefficient of thermal expansion between these materials ($\alpha 1 - \alpha 2$) is within a range of 0 and $9 \times 10^{-7}$ /°C, where $\alpha 1$ denotes a coefficient of thermal expansion of the former material and $\alpha 2$ denotes that of the latter material. --

Column 13
Line 7, change "class" to --glass--

Column 13
Line 21, change "C.," to --C;--

Column 13
Line 22, add the following:
--a yield point of said first glass material, At1, is higher than a yield point of said second glass material, At2, by 70°C or greater,--

Column 14
Line 1, after "method" add --of--

Column 14
Line 19, after "a" add --refraction--

Column 14
Line 30, change "ankali" to --alkali--

Column 14
Line 30, change "flourine" to --fluorine--

UNITED STATES PATENT AND TRADEMARK OFFICE
CERTIFICATE OF CORRECTION

PATENT NO. : 6,996,324 B2
APPLICATION NO. : 10/432920
DATED : February 7, 2006
INVENTOR(S) : Masahiro Hiraka et al.

It is certified that error appears in the above-identified patent and that said Letters Patent is hereby corrected as shown below:

Column 14
Line 32, after "The" add --method of--

Column 14
Line 34, after "barium" add --,--

Column 14
Line 37, after "$KHF_2$" add --,--

Column 14
Line 37, after "$CaF_2$" add --,--

Column 14
Line 62, add the following:
   --said glass plate constituting said lower cladding layer is a second glass material, having a coefficient of thermal expansion, a2;
   --said another glass plate constituting said core layer is a first glass material, having a coefficient of thermal expansion, a1;--

Column 15
Line 2, change "At2." to --At2,--

Column 15
Line 10, after "0.1" change "$\alpha$ m" to --$\mu$m--

Column 15
Line 10, after "1" change "$\alpha$ m" to --$\mu$m--

Column 15
Line 11, add --.--

Column 15
Line 12, change "a of" to --an--

Column 15
Line 13, change "where" to --wherein--

Column 15
Line 16, change "low" to --lower than--

UNITED STATES PATENT AND TRADEMARK OFFICE
CERTIFICATE OF CORRECTION

PATENT NO. : 6,996,324 B2
APPLICATION NO. : 10/432920
DATED : February 7, 2006
INVENTOR(S) : Masahiro Hiraka et al.

It is certified that error appears in the above-identified patent and that said Letters Patent is hereby corrected as shown below:

Column 15
Line 23, change "diatomic metal," to --diatomic metal),--

Column 15
Line 27, after "method" add --of--

Column 15
Line 47, after "($SiO_2$)" add --,--

Column 16
Line 8, after "0.1 μm" add --to 1 μm--

Column 16
Line 9, after "entire" add --surface--

Column 16
Line 13, change "borosillicate" to --borosilicate--

Column 16
Line 40, change "materials" to --material--

Column 16
Line 41, add the following:
--said first glass material, having a coefficient of thermal expansion, a1, and said second glass material, having a coefficient of thermal expansion, a2, are combined so that an absolute value of difference in coefficient of thermal expansion between said glass materials, (a1 - a2), is within a range of 0 and $9 \times 10^{-7}$/°C; and--

Column 16
Line 41, after the sentence "said first glass material, having a coefficient of thermal ... $9 \times 10^{-7}$/°C; and" add the following:
    --a yield point of said first glass material, At1, is higher than a yield point of said second glass material, At2, by 70°C or greater,--
    --where $α1$ and At1 respectively denote the coefficient of thermal expansion and the yield point of said first glass material, and $α2$ and At2 respectively denote the coefficient of thermal expansion and the yield point of said second glass material.--

UNITED STATES PATENT AND TRADEMARK OFFICE
CERTIFICATE OF CORRECTION

PATENT NO. : 6,996,324 B2
APPLICATION NO. : 10/432920
DATED : February 7, 2006
INVENTOR(S) : Masahiro Hiraka et al.

It is certified that error appears in the above-identified patent and that said Letters Patent is hereby corrected as shown below:

Column 16
Line 45, change "$KHF_2F$," to --$KHF_2$,--

Signed and Sealed this

Fifth Day of December, 2006

JON W. DUDAS
*Director of the United States Patent and Trademark Office*